Patented Oct. 25, 1938

2,134,235

UNITED STATES PATENT OFFICE 2,134,235

PRODUCTION OF MOLDABLE COMPOSITIONS

Fritz Pollak, Vienna, Austria

No Drawing. Application July 7, 1937, Serial No. 152,420. In Austria May 8, 1937

2 Claims. (Cl. 260—69)

This invention relates to the production of artificial compositions, and more particularly of molding powders destined to be made up into molded articles either by the hot pressing or by the hot injecting (die casting) method. The production of the molding powder according to the invention is effected in two stages, the first of which comprises condensing an aqueous solution of urea and hexamethylenetetramine in the absence of formaldehyde by a protracted boiling process, while in the second stage the reaction mass resulting from the first stage is converted with formaldehyde and a flux.

I have found that substances contained in the aqueous solution of the soft resin may be precipitated out without the condensation mass itself going into precipitation. This is the case since the aqueous solution contains, besides the soft resin, other compounds as well, such as amines, and ammonium compounds, ammonium carbonate, and the like, and also the substances added at the commencement or in the course of the condensation process, which do not react with the condensation mass. The quantities of amines and carbonates present in the solution of the soft resin may be quite remarkable. They arise from the decomposition of hexamethylenetetramine insofar as the latter does not participate in the condensation process (cf. Berliner Berichte, Vol. XXXVIII, 1905, pp. 880 ff.). Whereas hitherto, on account of the presence of all these substances in the solution of the soft resin, it has been necessary first to convert the soluble soft resin, by a baking process of long duration, into a soluble hard resin, with the view of thereafter hardening this soluble hard resin with the aid of formaldehyde I have succeeded in making the surprising discovery that by precipitating out substances contained in the soluble soft resin not only can the above-mentioned and fairly troublesome baking process be dispensed with, but that in this manner there can be obtained particularly high quality molding powders which have remarkable flowing properties, and which harden more rapidly than any powders of this kind hitherto known. For this reason the molding powders according to this invention are particularly well suited for handling by the die casting method.

In consequence of the readiness with which substances contained in the solution of the soft resin may be caused to precipitate out various additions may be made to this solution either at the beginning or in the course of the condensation process, provided these added substances are capable of being precipitated out again. After the carrying out of the precipitation reaction in the aqueous solution of the soft resin it becomes possible out of the thus purified soft resin to convert the insoluble hard resin directly into the desired molding powder, with the aid of acid, formaldehyde, and a suitable flux.

It is advisable to treat the aqueous solution of soft resin for example with such bodies of basic reaction as form carbonates that are insoluble in water, such as for instance oxides and hydroxides of the bi- and trivalent metals. In order to bring about complete precipitation of the insoluble precipitates it is desirable to dilute the solution sufficiently with water.

The carbonates present may also be removed from the solution by boiling the solution with a suitable acid until the carbon dioxide has escaped, and then eliminating the amines combined with the acid, as insoluble complex salts or in a similar manner. The substances added as condensing agents, provided they are capable of forming insoluble compounds, may also be removed from the solution before the hardening process. This has the advantage that the amounts of these additions may be regulated at will, without the necesity for considering whether the same could have any deleterious effect in the further course of the hardening process or not. Thus the substances added and the quantities thereof used, for the purpose of accelerating or facilitating the condensation process, may be determined without regard for what effect the same might have upon the subsequent course of the reaction. By using appropriately large quantities of such additions it becomes possible so to curtail or to control the condensation process that more highly or less highly polymerized products are obtained in the same periods of time.

To produce suitable hot molding powders it is necessary in this case also to add certain fluxes to the mass, such as for example reaction products from thiourea or its mono-substitution products, and formaldehyde, as also the condensation products from urethane and formaldehyde, and phenol and formaldehyde. What is essential is that these fluxes shall become converted into hardened resins in the hot press and at the same time serve as solvent for the urea resins. The compositions obtained in this manner are remarkable for the fact that, in spite of the use of considerable quantities of filler, they fuse to very thin liquids when heated. They pass readily through the thinnest injection tubes, and yet set particularly rapidly to infusible molded shapes. These compositions are thus eminently well suited for the hot die casting or hot injecting method of molding.

The following are illustrating examples of the practical carrying out of the method according to the present invention.

Examples (1) 240 parts by weight of urea are heated with 130.67 parts by weight of hexamethylenetetramine, 200 parts by volume of water, and one part by weight of phosphoric acid, for 20 hours under reflux. To the solution of the resulting soft resin there are then added 5 parts by weight of burned magnesia, and the resulting mixture is thereafter diluted with 700 parts by volume of water, filtered hot from the precipitated out ammonium-magnesium-phosphate, and evaporated down as required. There is then added a solution of 101 parts by weight of thiourea in 500 parts by volume of 40% formaldehyde, after which the resulting mixture is neutralized, mixed with a suitable filler (e. g. cellulose) with the addition of suitable coloring matter, dried at a temperature of 80–100° C., and pulverized. In this manner there is obtained a hot molding powder which has excellent flowing properties, sets very rapidly, and yields molded articles that are fast to boiling. When used with the hot injecting method perfect shapes are obtained within a few seconds at each operation.

(2) A particularly pure product is obtained if the condensation solution produced in accordance with Example (1) is acidulated with phosphoric acid (16 parts by weight) until the solution is of permanently acid reaction, the acid solution boiled for a short time to destroy the carbonates, and only then rendered alkaline again with magnesia (24 parts by wt.), allowing the ammonium-magnesium-phosphate to become precipitated out of the solution.

(3) If ammonium sulphate is utilized as condensing agent in this method it is advantageous to add barium hydroxide or caustic lime to the solution after condensation. Thus for example if the solution given in Example (1) be condensed with 2 parts by weight of ammonium sulphate instead of with phosphoric acid there is afterwards employed an addition of 12 parts by weight of barium hydroxide for precipitating out the sulphate and the carbonate. This solution is then boiled for half an hour. The dissolved excess of the alkaline earth is then precipitated with the accurately calculated required quantity of an acid that yields insoluble salts with the base used, for example sulphuric acid, oxalic acid, phosphoric acid. The filtrate obtained gives the same molding powder as that described in Example (1).

I claim:

1. In a process for making condensation products by interacting urea and hexamethylenetetramine in aqueous solution in the absence of formaldehyde, in the presence of slight quantities of a catalyst and with heating for a prolonged period of time, said condensation products being capable of being worked up to molding powders by means of formaldehyde and a flux, the step of carrying out the interaction of the said constituents in the presence of a slight quantity of a catalyst selected from the group of acids and salts thereof, the acid radical of which yields water-insoluble salts, and of precipitating and filtering out from the said aqueous solution the catalyst and impurities present therein with the aid of reagents selected from the group consisting of the oxides and hydroxides of the bi- and trivalent metals forming water-insoluble salts with the impurities and the said acid radicals of the said acids and salts thereof.

2. In a process for making condensation products by interacting urea and hexamethylenetetramine in aqueous solution in the absence of formaldehyde, in the presence of slight quantities of a catalyst and with heating for a prolonged period of time, said condensation products being capable of being worked up to molding powders by means of formaldehyde and a flux, the step of carrying out the interaction of the said constituents in the presence of a slight quantity of a catalyst selected from the group of acids and salts thereof, the acid radical of which yields water-insoluble salts, of adding acid to expel carbon dioxide evolved during the condensation process from the said solution, and of precipitating and filtering out from the said aqueous solution the added substances and impurities present therein with the aid of reagents selected from the group consisting of the oxides and hydroxides of the bi- and trivalent metals forming water-insoluble salts with the impurities and the said acid radical of the said acids and salts thereof.

FRITZ POLLAK.